US006928083B2

(12) United States Patent  (10) Patent No.: US 6,928,083 B2
Lee  (45) Date of Patent: Aug. 9, 2005

(54) CAS DATA PROCESSING APPARATUS OF STM-1 INTERFACE BLOCK

(75) Inventor: Kang-Phil Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 873 days.

(21) Appl. No.: 09/738,310

(22) Filed: Dec. 18, 2000

(65) Prior Publication Data

US 2001/0004365 A1 Jun. 21, 2001

(30) Foreign Application Priority Data

Dec. 16, 1999 (KR) .......................................... 1999-58336

(51) Int. Cl.[7] .............................................. H04L 12/56
(52) U.S. Cl. ...................... 370/410; 370/465; 370/466; 370/467; 370/522; 370/523; 370/907
(58) Field of Search .................................. 370/410, 465, 370/466, 467, 522, 523, 907

(56) References Cited

U.S. PATENT DOCUMENTS

| 6,434,229 | B1 | * | 8/2002 | Bradd et al. ................. 379/230 |
| 6,532,240 | B1 | * | 3/2003 | Jeong ........................... 370/465 |
| 6,751,236 | B1 | * | 6/2004 | Groenendaal ............... 370/522 |
| 6,778,503 | B1 | * | 8/2004 | Sproat et al. ............... 370/247 |

* cited by examiner

Primary Examiner—Steven Nguyen
Assistant Examiner—Clemence Han
(74) Attorney, Agent, or Firm—Fleshner & Kim, LLP

(57) ABSTRACT

A CAS data processing apparatus of an STM-1 interface block which is capable of processing CAS signaling data in real time is disclosed. The CAS data processing apparatus of the STM-1 interface block preferably includes a plurality of framers, which separately read signaling data streams from 21 E1 links, a CPU, which outputs a start signal in the CAS signaling data processing, a CAS signaling processing unit, which reformats the signaling data streams inputted from the plurality of the framers into report data in order of the each link, and a Common Memory, which stores the report data outputted from the CAS signaling processing unit.

30 Claims, 4 Drawing Sheets

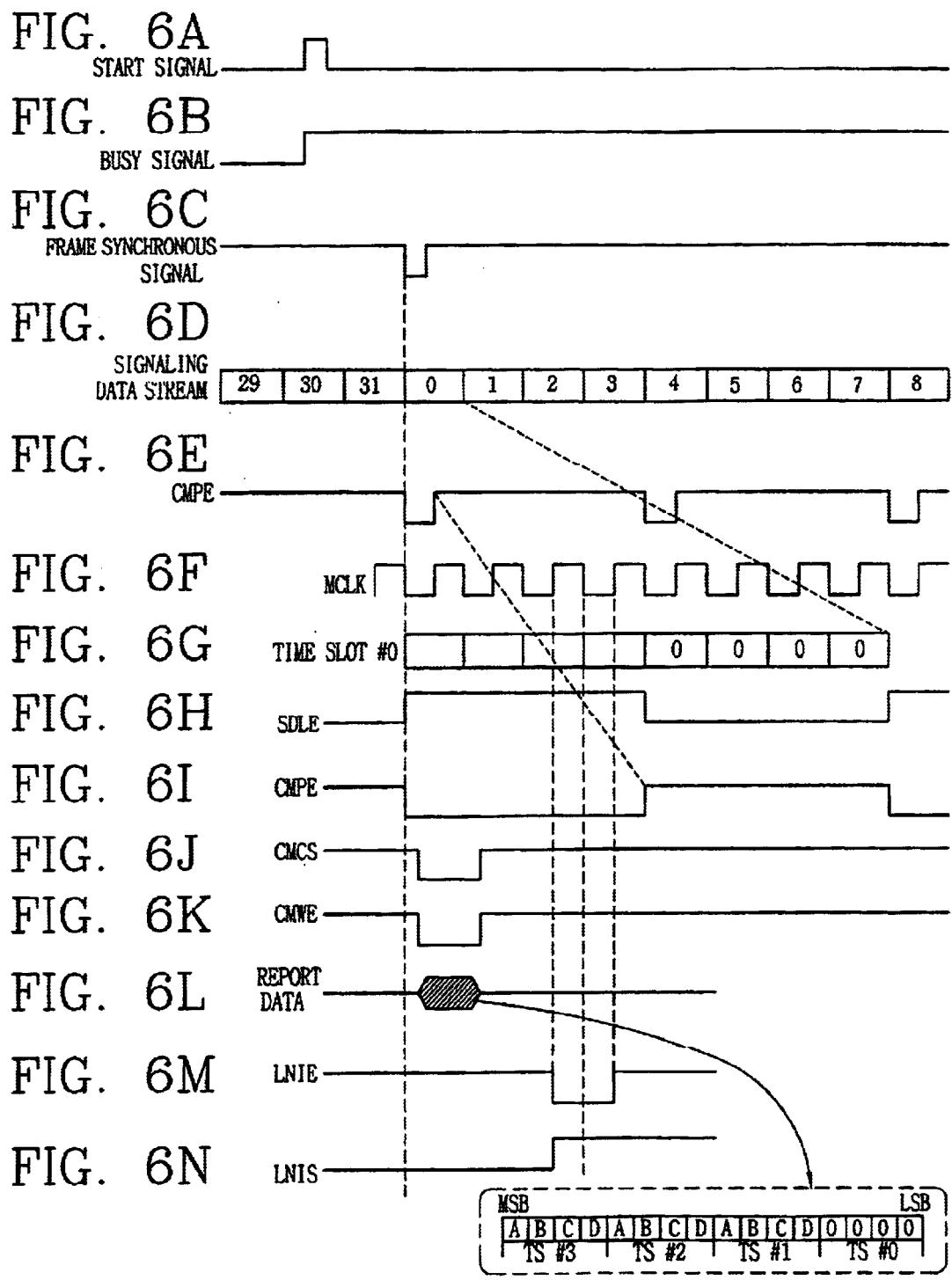

CAS DATA PROCESSING APPARATUS OF STM-1 INTERFACE BLOCK

BACKGROUND OF THE INVENTION

1. Field of the Invention

The present invention relates to an Synchronous Transport Module Level 1 (STM-1) interface block, and in particular to a Channel Associated Signaling (CAS) data processing apparatus capable of effectively processing CAS signaling data.

2. Background of the Related Art

Generally, a base-to-base interface of an exchanger for processing voices is performed through a 2.048 Mbps T1/E1 link. However, because many cables are required to connect a plurality of the T1/E1 link to the opposite exchanger, a T1/E1 signal is typically multiplexed/demultiplexed into T3/STM-1 signal through transmission equipment. The multiplexed signal is then transmitted/received.

FIG. 1 is a block diagram illustrating a first related art connection construction between exchangers. Exchangers 10, 13 are separately connected to MUX/DEMUXs 11, 12 through 63 E1 links. The MUX/DEMUXs 11,12 are connected to each other through an STM-1 link. The 63 E1 signals outputted from the exchanger 10 are thus multiplexed into an STM-1 signal in the MUX/DEMUX 11 and then transmitted to the STM-1 link. The MUX/DEMUX 12 demultiplexes the transmitted STM-1 signal into the original 63 E1 signals and outputs them to the exchanger 13. Accordingly, E1 base communication between exchangers 10, 13 can be performed.

The exchangers 10, 13 each include 16 E1 interface cards (not shown). Each E1 interface card processes a signal with respect to 4 E1 links. When the E1 interface cards are operated in as a CAS (Channel Associated Signaling) mode, they provide a CAS signaling data (hereinafter referred to signaling data) processing for each channel (time slot), an alarm function for the links, and various test functions. CAS is the transmission of signaling information within the channel.

FIG. 2 is a block diagram illustrating the conventional E1 interface card of the exchangers 10, 13 of FIG. 1.

Framers 100-1~100-4 receive a signaling data stream from 4 E1 links, respectively, and local memory (LM) 101 temporarily stores the signaling data outputted from the framers 100-1~100-4 through a CPU 102. The CPU 102 performs general control operations of the E1 interface card. The CPU 102 also reads the signaling data stored in the LM 101 and reformats it into a report data. A common memory (CM) 103 stores the report data temporarily, and interfaces the E1 interface card with a upper processor 104.

In operation, the framers 100-1~100-4 perform interface operations with respect to the 4 E1 links respectively, and read the signaling data stream from the corresponding link. The data stream is then stored in its register. Once the signaling data streams are stored, the CPU 102 outputs control signals to the framers 100-1~100-4 and reads the signaling data streams from the register of the each framers 100-1~100-4. Accordingly, as depicted in FIG. 3A, for one link, the signaling data steams about 32 channels (time slot) are read from the register, and are stored in the LM 101. The above operations for the other E1 links are repeated.

When the signaling data streams storing is completed, the CPU 102 reads the signaling data streams stored in the LM 101, reformats it into the report data depicted in FIG. 3B, and stores it on the CM 103. The above operation is performed in 8 msec real time cycle, and the processing for the signaling data stream of the 4 links has to be completed in 8 msec. Accordingly, the upper processor 104 performs the control operation for the STM-1 interface block by accessing the report data stored in the CM 103.

However, in the first related art connecting construction of the exchanger, because the E1 links have to be extended to a multiplexer 11 and demultiplexer 12, it causes expense increase and maintenance/repair difficulties. Accordingly, in order to solve above-mentioned problems and to process the E1 link more efficiently, a second connecting construction of the exchanger, as depicted in FIG. 4, is generally used.

As depicted in FIG. 4, in the second related art connection construction of the exchanger, the MUX/DEMUX included in transmission section of the first connecting construction are integrated with the exchangers 20, 21. That is, the exchanger 20, 21 include a STM-1 interface block 30 for a physical interface. The STM-1 block 30 includes a STM-1 link interface 30-1, a synchronous digital hierarchy (SDH) 30-2 and an E1 processing unit 30-3.

The STM-1 link interface 30-1 transmits and receives STM-1 signals and the SDH 30-2 constructs the STM-1 signal by multiplexing/demultiplexing the E1 signal in accordance with an ITU-T (International Telecommunication Union-Telecommunication) recommendation. The E1 processing unit 30-3 processes the E1 links in the same way as the first related art E1 interface card (FIG. 2). The E1 processing unit comprises 3 E1 interface cards, each of which processes 21 E1 links respectively.

Accordingly, the E1 processing unit 30-3 of the STM-1 interface block 30 performs various functions such as signaling signal processing, alarming, and error processing. Here, the operations, except for the test function, should be processed in real time by the E1 processing unit 30-3. The above functions thus have to be performed in an 8 msec cycle in accordance with a system (upper processor) request.

The conventional E1 interface card adapted to the first connecting construction of the exchanger has various problems. For example, it only performs the processing with respect to the 4 E1 links. Accordingly, if the number of E1 links to be processed is increased, the number of the E1 interface cards and CPUs also have to be increased. This results in complex circuit construction and other difficulties. For example, to process 63 E1 signals, 16 E1 interface cards and 16 CPUs for the 16 E1 interface cards are required.

In addition, the conventional E1 interface card can be used only when the number of E1 links is low. In other words, the load of the CPU needs to be small. Accordingly, if 21 E1 links are present for processing in the STM-1 interface block of the second connecting construction, the related art E1 interface card cannot be used as it is. In other words, when the number E1 links increases, the signaling data processing time is increased in proportion to the number of links. Consequently, the related E1 interface card having the limited CPU processing speed cannot process the signaling data in the required 8 msec.

Also, to solve above-mentioned problem, the high speed CPU may be used, but it is not economical due to its expensive price.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is an object of the present invention to provide a CAS data processing apparatus of an STM-1 interface block that substantially obviates the disadvantages caused by problems in the related art. It is another object of the present invention to provide a CAS data processing apparatus of an STM-1 interface block that is capable of processing CAS signaling data in real time through hardware logic.

It is another object of the present invention to provide a CAS data processing apparatus of STM-1 interface block which can be implemented by a low price CPU by reducing a load of a CPU in processing the CAS signaling data.

To achieve at least these objects in whole or in parts, there is provided a CAS data processing unit of a STM-1 interface, comprising a plurality of framers for abstracting signaling data streams from a plurality of E1 links, a CPU for outputting a start signal in the CAS signaling data processing, a CAS signaling processing unit for reformatting the signaling data streams outputted from the plurality of the framers into a report data, and a common memory for storing the report data outputted from the CAS signaling processing unit.

To further achieve at least these objects in whole or in parts, there is provided a channel associated signaling (CAS) data processing apparatus of a STM-1 interface block, comprising a plurality of framers, coupled to extract signaling data streams from a plurality of E1 links; a CPU, configured to output a start signal to control signaling data processing; a signaling processing unit, which is activated by the start signal to reformat the signaling data streams inputted from the plurality of framers and output report data in an order of each link; a CPU interface which interfaces the CPU and the signaling processing unit; and a common memory (CM) interface, which interfaces the CAS signaling processing unit with a common memory to provide the report data to the common memory.

To further achieve at least these objects in whole or in parts, there is provided a data processing apparatus for a STM-1 interface block, comprising a plurality of framers, configured to interface 21 E1 links and extract signaling data streams from the E1 links; a CAS signaling processing unit, which reformats the signaling data streams outputted from the plurality of framers into report data in link order; a common memory (CM) coupled to store the report data outputted from the CAS signaling processing unit; a stream select unit which outputs the inputted signaling data streams in a prescribed order in accordance with a link increase signal outputted from the CAS signaling processing unit; a signaling processing unit which reads the bit stream outputted from the stream select unit and reformats it into the report format; a CPU coupled to output a start signal to the CAS signaling processing unit to initiate CAS signaling data processing; a CPU interface which interfaces the CPU and the signaling processing unit; and an address generation unit which generates a write address of the CM in a prescribed order in accordance with the address increase signal outputted from the CAS signaling processing unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 6~6N are input-output timing diagrams for illustrating the processing of the signaling data stream of FIG. 5.

DETAILED DESCRIPTION OF PREFERRED EMBODIMENTS

Figure 1:
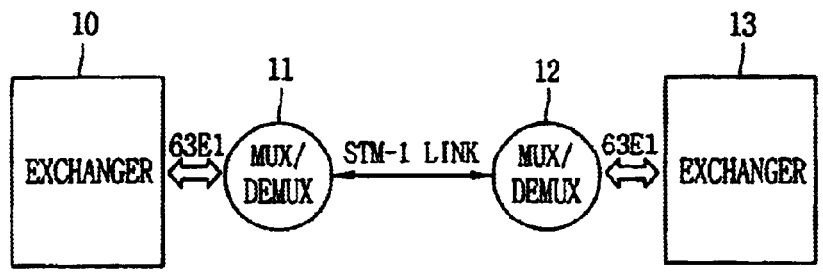
FIG. 1 is a block diagram illustrating construction of a connection scheme of a related art exchanger.
Figure 2:
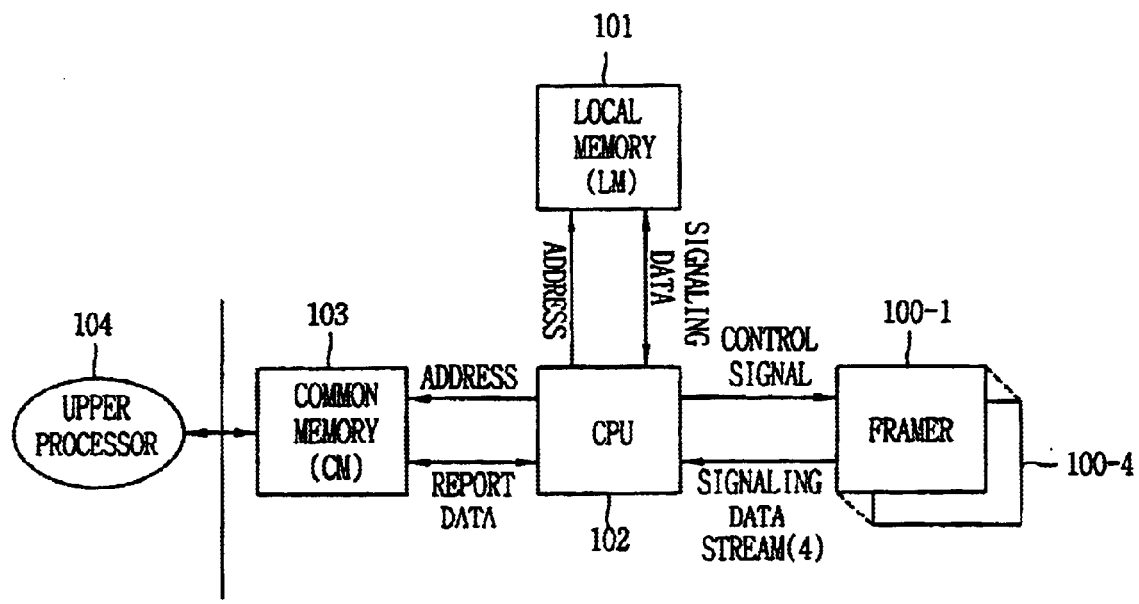
FIG. 2 is a block diagram illustrating a related art E1 interface card of the exchanger of FIG. 1.
Figure 3A:
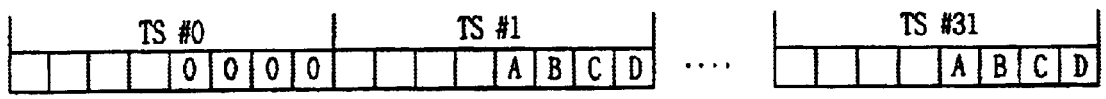
FIG. 3A is a drawing illustrating a signaling data stream format of FIG. 2.
Figure 3B:
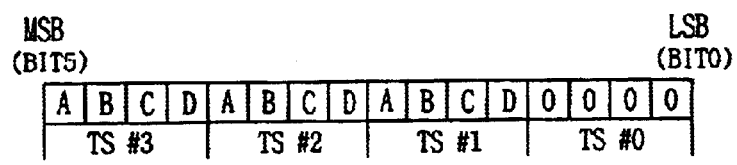
FIG. 3B is a drawing illustrating a report data format of the signaling data stream of FIG. 3A.
Figure 4:
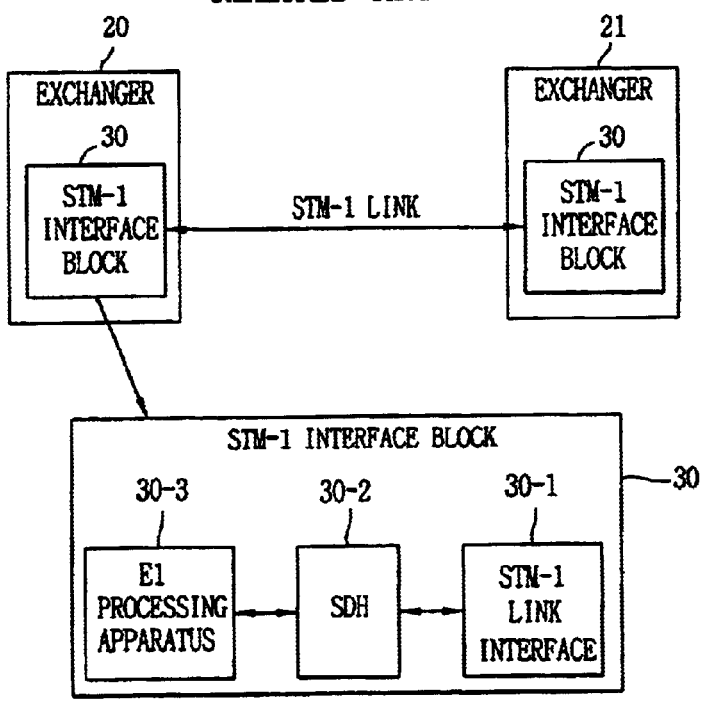
FIG. 4 is a block diagram illustrating a second connecting construction of the related art exchanger.

A CAS data processing apparatus of an STM-1 interface block according to a preferred embodiment of the present invention is preferably implemented within an E1 processing unit similar to the second connecting construction of the related art exchanger depicted in FIG. 4. The CAS data processing apparatus can reduce a load of a CPU and process signaling data in real time by processing the CAS signaling data (hereinafter referred to signaling data) through an additional hardware logic.

Figure 5:
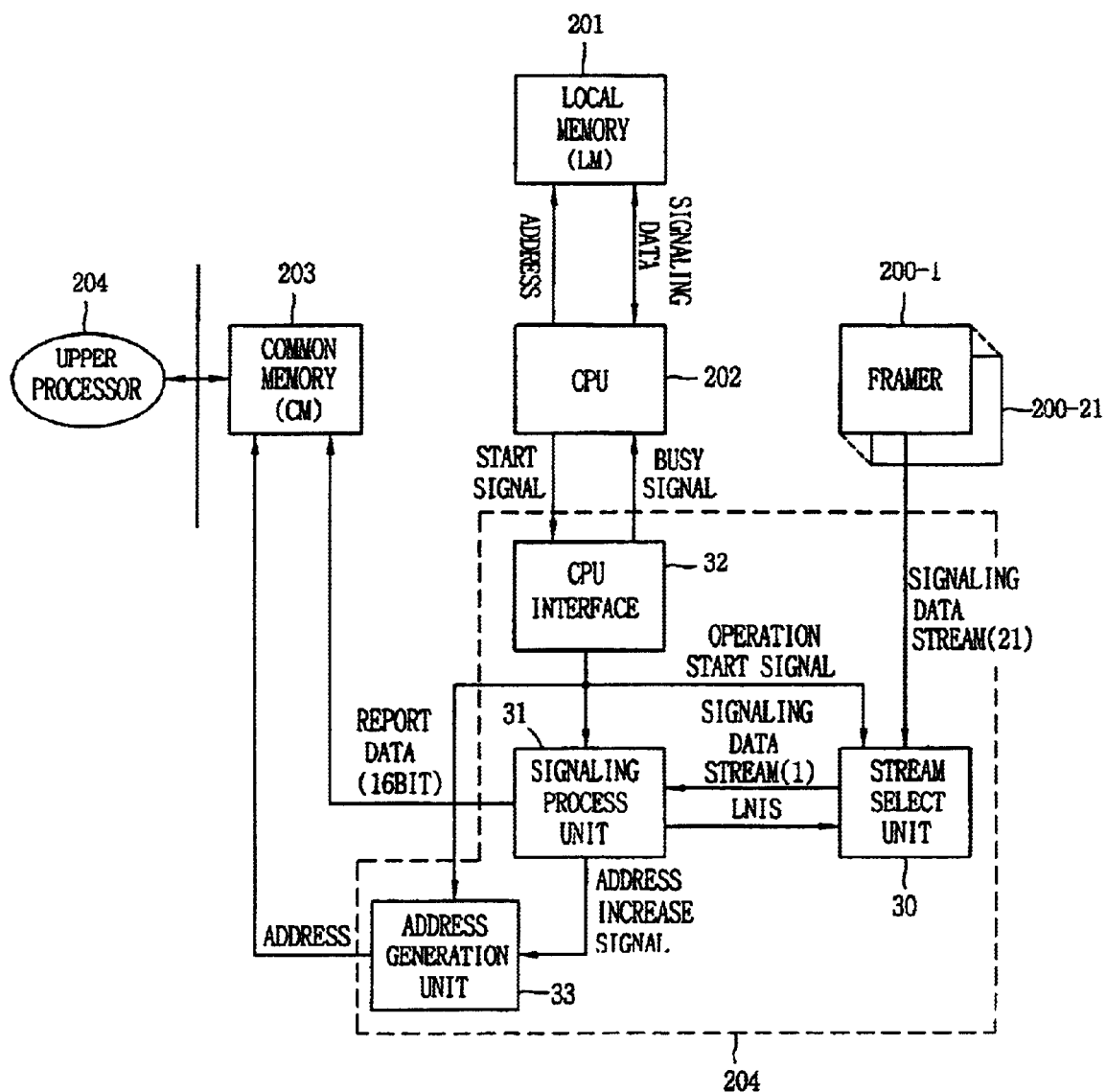
FIG. 5 is a block diagram illustrating the preferred embodiment of a CAS data processing apparatus of an STM-1 interface block of the present invention.

FIG. 5 depicts the preferred embodiment of the CAS data processing apparatus of the STM-1 interface block of the present invention. As shown, the apparatus includes a plurality of framers 200-1~200-21, a LM (Local Memory) 201, a CPU 202, a CM (Common Memory) 203 and a CAS signaling processing unit 204.

The framers 200-1~200-21 perform E1 link interface, and abstract the signaling data streams from twenty-one E1 links. The CPU 202 performs general control operations, and outputs a start pulse to the CAS signaling processing unit 204 in the signaling data processing. The LM 201 is a memory which stores the processed data of the CPU 202, and the CM 203 is a memory which temporarily stores report data outputted from the CAS signaling processing unit 204.

The CAS signaling processing unit 204 preferably includes a stream select unit 30 which receives the signaling data stream synchronized with a system clock from the framers 200-1~200-21, and outputs it in a prescribed bit stream order. A signaling processing unit 31 is provided to temporarily store a bit stream outputted from the stream select unit 30 and to convert the bit stream into a report format. A CPU interface 32 is provided to interface between the CPU 202 and signaling processing unit 31, and an address generation unit 33 is provided to generate a read address of the CM 203 in accordance with an address increase signal outputted from the signaling processing unit 31.

An operation of the CAS data processing apparatus of the STM-1 interface block of the present invention will now be described with reference to the accompanying drawings.

The framers 200-1~200-21 abstract the 21 E1 links signaling data, and output that data to the CAS signaling processing unit 204. The CPU 202 outputs the start pulse (FIG. 6A) to the CPU interface 32 of the CAS signaling processing unit 204.

The CPU interface 32 having thus received the start pulse indicates that the signaling data is now being processed by outputting a busy signal to the CPU 201, as shown in FIG.

6B. The start pulse of the CPU 202 is ignored when the busy signal is generated. The CPU interface also activates the stream select unit 30, the signaling processing unit 31 and the address generation unit 33, as shown in FIG. 6C. The stream select unit 30 then receives the 21 signaling data streams synchronized with the system clock signal from each of the framers, and outputs a first link signaling data stream to the signaling processing unit 31.

The signaling processing unit 31 generates a low level CMPE (Common Memory Process Enable signal) every 4 time periods, as shown in FIG. 6E. Next, as shown in FIGS. 6H, 6J, and 6K, a SDLE (Signaling Data Latch Enable signal), a CMCS (Common Memory Chip Select signal), and a CMWE (Common Memory Write Enable signal) are generated by being synchronized with the CMPE signal. Herein, the CMCS and CMWE are operated in a write mode by the CM 203.

Accordingly, when the SDLE is at a low level depicted (FIG. 6H), the signaling processing unit 31 reads each channel's (time slot) data from the signaling data stream in accordance with the read pulse signal (MCLK), depicted in FIG. 6F. The signaling processing unit 31 temporarily stores the read data on an inner circuit For example, as depicted in FIG. 6G, the signaling processing unit 31 reads and stores the time slot #0 data "0000". The read pulse signal (MCLK) is preferably the system clock signal divided into two, and a cycle of it is same as an interval of one time slot. Thus the read pulse cycles through two times for every time slot.

When 4 channels (time slot) have been read, the signaling processing unit 31 reformats the stored signaling data into the report data form, as shown in FIG. 6L and outputs the formatted data to the CM 203. It also outputs an address increase signal to the address generation unit 33. When the CM access is finished in accordance with the address increase signal outputted from the signaling processing unit 31, the address generation unit 33 increases a write address of the CM 203. Accordingly, the report data, as shown in FIG. 6L, outputted from the signaling processing unit 31 is stored in the CM 203 in accordance with the write address outputted from the address generation unit 33.

If the signaling data processing for one link (32 channels) is completed, the signaling processing unit 31 outputs a LNIS (Link Number Increment Signal), as shown in FIG. 6N, in accordance with a LNIE (Link Number Increment Enable), as shown in FIG. 6M, to the stream select unit 30, thereby receiving a second link signaling data stream from the stream select unit 30.

When the processing of the 21 links of signaling data has been completed in the same manner, the CPU interface 32 releases the busy signal, and waits for the next start signal input. At that time, the upper processor 205 accesses the report data stored in the CM 203 and controls the STM-1 interface block. The time required for processing the 21 E1 links is preferably maximum 2.75 msec.

In addition, the stream select unit 30 and signaling processing unit 31 can be combined as a CAS signaling processing unit, and the address generation unit 33 can be replaced by the CM interface because it shows same operation and effects. The present invention is capable of applying to a trunk connection board high of a speed-hierarchy such as E3 or T3 for processing large amounts of CAS signaling data, and it shows the same operation and effects.

The CAS data processing apparatus of the STM-1 interface block of the present invention has many advantages. For example, it is capable of processing efficiently the CAS signaling data in a prescribed time (8 msec) even if the number of E1 links increases. Furthermore, the CPU generates only the start signal in the CAS signaling data. Accordingly the CPU is free to perform other jobs sufficiently.

Moreover, the CAS data processing apparatus of the STM-1 interface block as described herein can reduce the load of the CPU drastically by processing the CAS signaling data though the logic of the separate hardware. Accordingly it is possible to construct the system with the low speed CPU, thus the manufacture cost can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A channel associated signaling (CAS) data processing apparatus of an STM-1 interface block, comprising:
   a plurality of framers, each configured to receive a signaling data stream from at least one communication circuit link;
   a CAS signaling processing unit, coupled to receive a start signal from a CPU and the signaling data stream from each of the framers, and reformat the signaling data streams into a prescribed format; and
   a common memory (CM) coupled to receive and store the formatted data outputted from the CAS signaling processing unit,
   wherein the CAS signaling processing unit outputs a busy signal to the CPU upon receiving the start signal, and maintains the busy signal until the data streams from each of the framers has been processed.

2. The apparatus of claim 1, wherein the CAS signaling processing unit ignores the start signal outputted from the CPU when the busy signal is maintained.

3. A channel associated signaling (CAS) data processing apparatus of an STM-1 interface block, comprising:
   a plurality of framers, each configured to receive a signaling data stream from at least one communication circuit link;
   a CAS signaling processing unit, coupled to receive a start signal from a CPU and the signaling data stream from each of the framers, and reformat the signaling data streams into a prescribed format; and
   a common memory (CM) coupled to receive and store the formatted data outputted from the CAS signaling processing unit,
   wherein the CAS signaling processing unit comprises:
   a stream selector coupled to receive the signaling data streams synchronized with a system clock from the plurality of framers, and output an ordered signaling data bit stream;
   a signaling processing unit, coupled to receive and store the data bit stream outputted from the stream selector, and convert the received data into a report format;
   a CPU interface to provide an interface between the CPU and the signaling processing unit; and
   an address generation circuit to generate a write address of the CM in accordance with an address increase signal outputted from the signaling processing unit.

4. The apparatus of claim 3, wherein the CAS signaling processing unit reads a prescribed number of time slots from the signaling data stream in accordance with a read clock signal and reformats the data into the report format.

5. The apparatus of claim 4, wherein one cycle of the read clock signal is equivalent to an interval of one time slot.

6. The apparatus of claim 3, wherein the CPU interface receives the start signal from the CPU and generates a control signal that activates the stream selector, the signaling processing unit, and the address generation circuit, and wherein the CPU interface outputs the busy signal to the CPU until the signaling processing unit has converted all of the received data into the report format.

7. The apparatus of claim 3, wherein the signaling processing unit outputs a link number increment signal (LNIS) to the stream selector when the processing for one link is finished, and receives the signaling data stream for the next link from the stream selector in response to the LNIS.

8. The apparatus of claim 3, wherein the address generation circuit increases the write address of the CM in response to an address control signal from the signaling processing unit when the CM access is finished.

9. A channel associated signaling (CAS) data processing apparatus of an STM-1 interface block, comprising:
   a plurality of framers, coupled to extract signaling data streams from a plurality of E1 links;
   a CPU configured to output a start signal to control signaling data processing;
   a signaling processing unit, which is activated by the start signal to reformat the signaling data streams inputted from the plurality of framers and output report data in an order of each link;
   a CPU interface which interfaces the CPU and the signaling processing unit; and
   a common memory (CM) interface, which interfaces the signaling processing unit with a common memory to provide the report data to the common memory,
   wherein a number of E1 links is 21, and the CPU interface activates the signaling processing unit in response to the start signal.

10. A channel associated signaling (CAS) data processing apparatus of an STM-1 interface block, comprising:
    a plurality of framers, coupled to extract signaling data streams from a plurality of E1 links;
    a CPU configured to output a start signal to control signaling data processing;
    a signaling processing unit, which is activated by the start signal to reformat the signaling data streams inputted from the plurality of framers and output report data in an order of each link;
    a CPU interface which interfaces the CPU and the signaling processing unit; and
    a common memory (CM) interface, which interfaces the signaling processing unit with a common memory to provide the report data to the common memory,
    wherein the CPU interface outputs a busy signal to the CPU during signaling data processing by the signaling processing unit, and wherein the start signal outputted from the CPU is ignored during when the busy signal is outputted.

11. A channel associated signaling (CAS) data processing apparatus of an STM-1 interface block, comprising:
    a plurality of framers, coupled to extract signaling data streams from a plurality of E1 links;
    a CPU configured to output a start signal to control signaling data processing;
    a signaling processing unit, which is activated by the start signal to reformat the signaling data streams inputted from the plurality of framers and output report data in an order of each link;
    a CPU interface which interfaces the CPU and the signaling processing unit; and
    a common memory (CM) interface, which interfaces the signaling processing unit with a common memory to provide the report data to the common memory,
    wherein the signaling processing unit comprises:
    a stream selector coupled to receive the signaling data streams synchronized with a system clock from the plurality of the framers and to output an ordered signaling data stream; and
    a signaling processor coupled to receive the ordered signaling data streams from the stream selector and to reformat the ordered signaling data into a prescribed number of time slots including report data.

12. The apparatus of claim 11, wherein one cycle of the clock signal is equivalent to an interval of one time slot.

13. The apparatus of claim 11, wherein the CM interface increases the write address of the CM in accordance with an address increase signal of the signaling processor when the CM access is finished.

14. The apparatus of claim 11, wherein the prescribed number of time slots is 4.

15. A data processing apparatus for a STM-1 interface block, comprising:
    a plurality of framers, configured to interface 21 E1 links and extract signaling data streams from the E1 links;
    a channel associated signaling (CAS) processing unit, which reformats the signaling data streams outputted from the plurality of framers into report data in link order;
    a common memory (CM) coupled to store the report data outputted from the CAS signaling processing unit;
    a stream select unit which outputs the inputted signaling data streams in a prescribed order in accordance with a link number increment signal outputted from the CAS signaling processing unit;
    a signaling processing unit which reads the bit stream outputted from the stream select unit and reformats it into the report format;
    a CPU coupled to output a start signal to the CAS signaling processing unit to initiate CAS signaling data processing;
    a CPU interface which interfaces the CPU and the signaling processing unit; and
    an address generation unit which generates a write address of the CM in a prescribed order in accordance with the address increase signal outputted from the CAS signaling processing unit,
    wherein the signaling processing unit outputs the busy signal to the CPU during signaling data processing, and the start signal is ignored when the busy signal is outputted.

16. A data processing apparatus for a STM-1 interface block, comprising:
    a plurality of framers, configured to interface 21 E1 links and extract signaling data streams from the E1 links;
    a channel associated signaling (CAS) processing unit, which reformats the signaling data streams outputted from the plurality of framers into report data in link order;

a common memory (CM) coupled to store the report data outputted from the CAS signaling processing unit;

a stream select unit which outputs the inputted signaling data streams in a prescribed order in accordance with a link number increment signal outputted from the CAS signaling processing unit;

a signaling processing unit which reads the bit stream outputted from the stream select unit and reformats it into the report format;

a CPU coupled to output a start signal to the CAS signaling processing unit to initiate CAS signaling data processing;

a CPU interface which interfaces the CPU and the signaling processing unit; and an address generation unit which generates a write address of the CM in a prescribed order in accordance with the address increase signal outputted from the CAS signaling processing unit, wherein the CAS signaling processing unit reads each channel data from the signaling data stream in accordance with a read clock signal and reformats the channel data into the report data when a 4 time slot read is completed.

17. The apparatus of claim 16, wherein one cycle of the read clock signal is equivalent to an interval of one time slot.

18. A data processing apparatus for a STM-1 interface block, comprising:

a plurality of framers, configured to interface 21 E1 links and extract signaling data streams from the E1 links;

a channel associated signaling (CAS) processing unit, which reformats the signaling data streams outputted from the plurality of framers into report data in link order;

a common memory (CM) coupled to store the report data outputted from the CAS signaling processing unit;

a stream select unit which outputs the inputted signaling data streams in a prescribed order in accordance with a link number increment signal outputted from the CAS signaling processing unit;

a signaling processing unit which reads the bit stream outputted from the stream select unit and reformats it into the report format;

a CPU coupled to output a start signal to the CAS signaling processing unit to initiate CAS signaling data processing;

a CPU interface which interfaces the CPU and the signaling processing unit; and an address generation unit which generates a write address of the CM in a prescribed order in accordance with the address increase signal outputted from the CAS signaling processing unit, wherein the signaling processing unit outputs a link number increment signal to the stream select unit when processing of one link is completed, and then receives the signaling data stream of the next link.

19. A channel associated signaling (CAS) data processing apparatus of an STM-1 interface block, comprising:

a plurality of framers, each configured to receive a signaling data stream from at least one communication circuit link;

a CAS signaling processing unit, coupled to receive a start signal from a CPU and the signaling data stream from each of the framers, and reformat the signaling data streams into a prescribed format; and a common memory (CM) coupled to receive and store the formatted data outputted from the CAS signaling processing unit, wherein the at least one communication circuit link comprises one of E1 links and T1 links, and wherein each one of the plurality of framers the signaling data stream from a corresponding link.

20. A channel associated signaling (CAS) data processing apparatus of an STM-1 interface block, comprising:

a plurality of framers, coupled to extract signaling data streams from a plurality of E1 links;

a CPU configured to output a start signal to control signaling data processing;

a signaling processing unit, which is activated by the start signal to reformat the signaling data streams inputted from the plurality of framers and output report data in an order of each link;

a CPU interface which interfaces the CPU and the signaling processing unit; and a common memory (CM) interface, which interfaces the signaling processing unit with a common memory to provide the report data to the common memory, wherein the plurality of links comprises 21 links.

21. A channel associated signaling processing unit, comprising:

a stream selector, coupled to receive a data stream from a communications channel link;

a signaling processing unit, coupled to receive an output of the stream selector and output it in a prescribed format; and a controller, coupled to provide a control signal to the to the stream selector and the signaling processing unit, and generate a write address signal to control a storage of an output of the signaling processing unit, wherein the controller comprises:

a CPU interface, configured to receive a start signal from a CPU, output a busy signal to the CPU when the signaling processing unit is processing the output of the stream selector, and output the control signal to the to the stream selector and the signaling processing unit, and an address generator, coupled to receive an address increase signal from the signaling processing unit and the control signal and output the write address signal.

22. A channel associated signaling processing unit, comprising:

a stream selector, coupled to receive a data stream from a communications channel link;

a signaling processing unit, coupled to receive an output of the stream selector and output it in a prescribed format; and a controller, coupled to provide a control signal to the to the stream selector and the signaling processing unit, and generate a write address signal to control a storage of an output of the signaling processing unit, wherein the stream selector is configured to extract signaling data streams from a plurality of E1 links through a corresponding plurality of framers.

23. A channel associated signaling processing unit, comprising:

a stream selector, coupled to receive a data stream from a communications channel link;

a signaling processing unit, coupled to receive an output of the stream selector and output it in a prescribed format; and a controller, coupled to provide a control signal to the to the stream selector and the signaling processing unit, and generate a write address signal to control a storage of an output of the signaling processing unit, wherein the signaling processing unit provides a link number increment signal (LNIS) to the stream selector when the processing for one channel link is finished, and receives a signaling data stream for the next channel link from the stream selector in response to the LNIS.

24. A channel associated signaling processing unit, comprising:

a stream selector, coupled to receive a data stream from a communications channel link;

a signaling processing unit, coupled to receive an output of the stream selector and output it in a prescribed format;

a controller, coupled to provide a control signal to the to the stream selector and the signaling processing unit, and generate a write address signal to control a storage of an output of the signaling processing unit; and a plurality of framers, coupled to provide the data stream to the stream selector, a CPU interface, configured to receive a start signal from a CPU and generate the control signal, and a common memory, coupled to receive the write address signal and store the formatted data outputted by the signaling processing unit.

25. A channel associated signaling (CAS) data processing apparatus of an STM-1 interface block, comprising:

a plurality of framers, coupled to extract signaling data streams from a plurality of E1 links;

a CPU configured to output a start signal to control signaling data processing;

a signaling processing unit, which is activated by the start signal to reformat the signaling data streams inputted from the plurality of framers and output report data in an order of each link;

a CPU interface which interfaces the CPU and the signaling processing unit; and a common memory (CM) interface, which interfaces the signaling processing unit with a common memory to provide the report data to the common memory, wherein once the CPU outputs the start signal to begin the signaling data processing, the CPU interface ignores signals from the CPU until the signaling data processing is completed such that the CPU is free to perform other tasks.

26. The apparatus of claim 25, wherein a number of E1 links is 21, and the CPU interface activates the signaling process unit in response to the start signal.

27. The apparatus of claim 25, wherein the CPU interface outputs a busy signal to the CPU during signaling data processing by the signaling processing unit, and wherein the start signal outputted from the CPU is ignored during when the busy signal is outputted.

28. The apparatus of claim 25, wherein the signaling processing unit comprises:

a stream selector coupled to receive the signaling data streams synchronized with a system clock from the plurality of the framers and to output an ordered signaling data stream; and a signaling processor coupled to receive the ordered signaling data streams from the stream selector and to reformat the ordered signaling data into a prescribed number of time slots including report data.

29. The apparatus of claim 25, wherein one cycle of the clock signal is equivalent to an interval of one time slot.

30. The apparatus of claim 25, wherein the CM interface increases the write address of the CM in accordance with an address increase signal of the signaling processor when the CM access is finished.

* * * * *